United States Patent
Carr et al.

(10) Patent No.: US 7,129,425 B2
(45) Date of Patent: Oct. 31, 2006

(54) AXLE VERTICAL LOAD MEASUREMENT DEVICE AND METHOD

(75) Inventors: Gary A. Carr, Fairfax, VA (US); Daniel J. Fullum, Leonard, MI (US); William L. Jordan, Washington, DC (US)

(73) Assignee: ENSCO, Inc., Falls Church, VA (US)

( * ) Notice: Subject to any disclaimer, the term of this patent is extended or adjusted under 35 U.S.C. 154(b) by 166 days.

(21) Appl. No.: 10/809,818

(22) Filed: Mar. 26, 2004

(65) Prior Publication Data

US 2004/0251058 A1 Dec. 16, 2004

Related U.S. Application Data

(60) Provisional application No. 60/457,294, filed on Mar. 26, 2003.

(51) Int. Cl.
*G01G 19/08* (2006.01)

(52) U.S. Cl. .................. 177/136; 177/DIG. 9

(58) Field of Classification Search ............... 177/136, 177/211, 229, 137–138, DIG. 9; 73/862.042, 73/862.043, 862.44, 862.045, 862.046, 862.041
See application file for complete search history.

(56) References Cited

U.S. PATENT DOCUMENTS

| | | | |
|---|---|---|---|
| 3,808,693 A | 5/1974 | Plasser et al. | |
| 3,878,908 A | 4/1975 | Andersson et al. | |
| 4,756,374 A | 7/1988 | Bailey et al. | |
| 4,789,033 A | 12/1988 | Dohrmann | |
| 4,834,199 A | 5/1989 | Bolland | |
| 4,836,034 A * | 6/1989 | Izumi et al. ........... | 73/862.044 |
| 5,522,468 A | 6/1996 | Dohrmann et al. | |
| 5,880,409 A | 3/1999 | Hartman | |
| 6,037,550 A | 3/2000 | Bradley | |
| 6,118,083 A | 9/2000 | Boyovich et al. | |
| 6,441,324 B1 * | 8/2002 | Stimpson ................. | 177/137 |
| 2001/0009206 A1 | 7/2001 | Lines | |

* cited by examiner

*Primary Examiner*—Kamand Cuneo
*Assistant Examiner*—Sean Kayes
(74) *Attorney, Agent, or Firm*—Nixon Peabody LLP; Jeffrey L. Costellia

(57) ABSTRACT

A vertical load measurement device and a method for measuring a load at least partially supported by an axle of a railcar are disclosed. The measurement device includes a bearing adapter sized to be mounted between a load bearing member of the railcar and an axle bearing housing of the railcar. The beam member has a first end and a second end, at least one end being secured to the bearing adapter, and a midsection extending between the ends which supports the load applied by the load bearing member of the railcar. The midsection of the beam member is vertically spaced from the bearing adapter to allow deflection of the beam member in response to the load applied by the load bearing member. The vertical load measurement device also includes a sensor secured to the beam member which measures the deflection of the beam member.

27 Claims, 3 Drawing Sheets

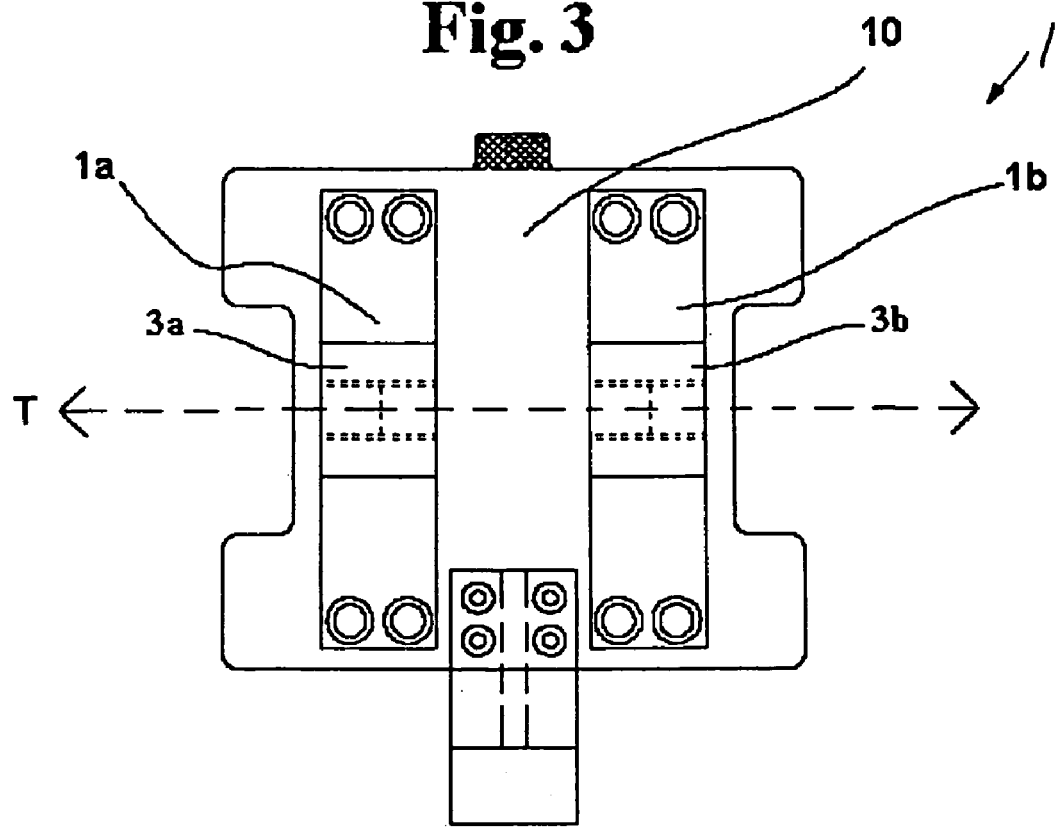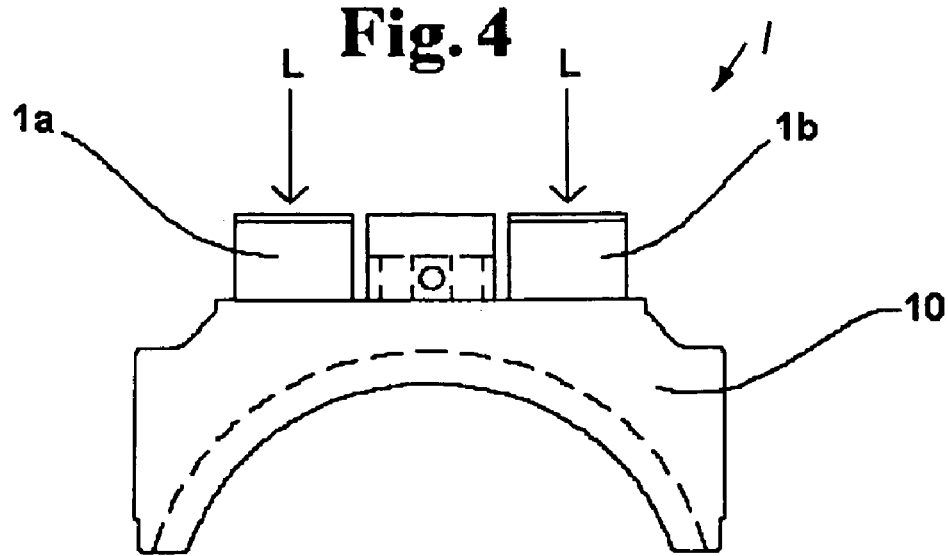

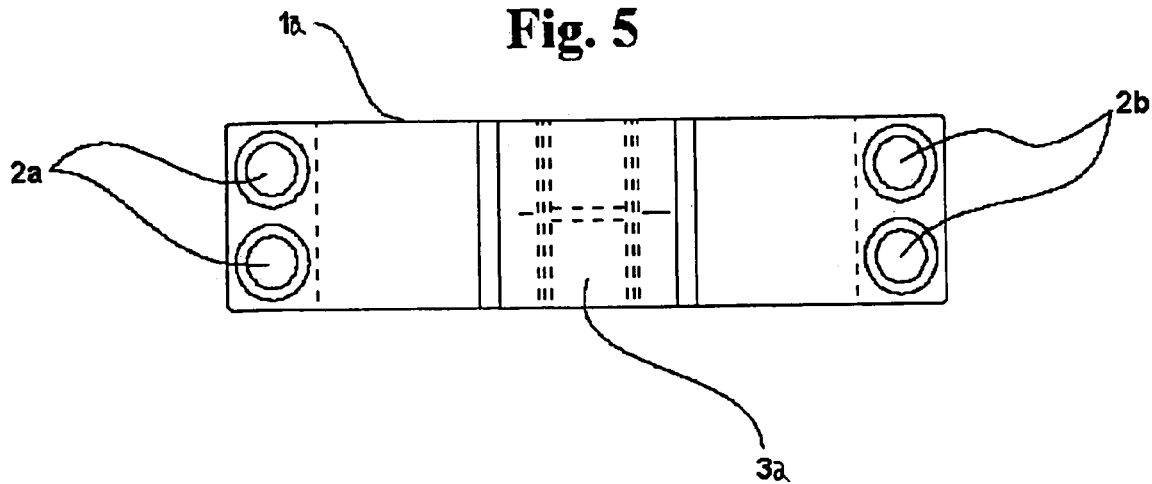
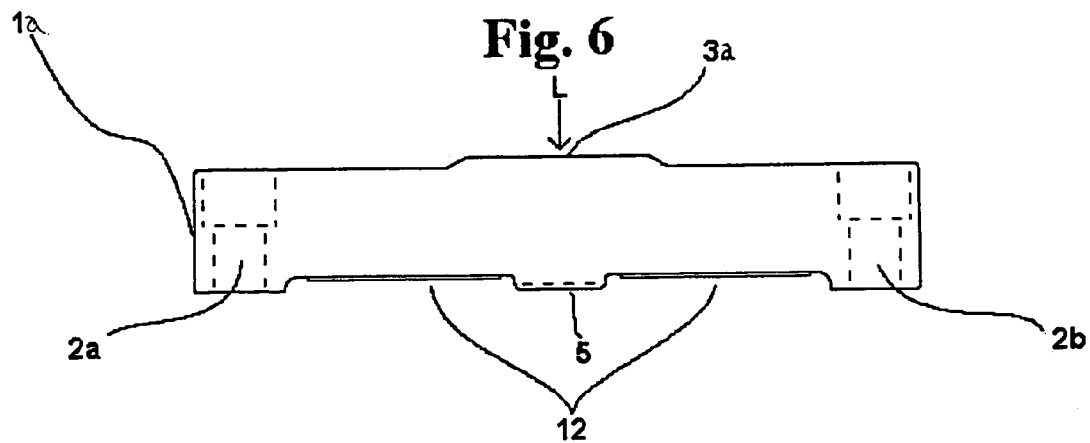

AXLE VERTICAL LOAD MEASUREMENT DEVICE AND METHOD

This application claims priority to U.S. Provisional Application No. 60/457,294, filed Mar. 26, 2003, the contents of which are incorporated herein by reference.

BACKGROUND OF THE INVENTION

1. Field of the Invention

This invention relates to a device and method for measuring vertical load that is at least partially supported by an axle of a vehicle such as a railroad car.

2. Description of the Related Art

In the railroad industry, it is frequently desirable to know the weight of a railroad car, and the load supported by each axle of the railroad car. For instance, in the railroad industry, the cost of a shipment may be based on the weight of the shipment. Thus, to ascertain accurate shipment charges, accurate weight of the shipment is required.

In addition, it is also advantageous to know the load of vehicles such as railroad cars because load limits of these vehicles are often exceeded. Overloading of a railcar can detract from the safety of the railcar since various components of the railcar, such as the axles, have limits to the load they can safely support. If the load supported by an axle is too great, the axle may become damaged or even catastrophically fail. Similar risks exist for other components in the load bearing system of a railroad car.

There are known devices for measuring the load of various vehicles such as tractor-trailers. One known method for measuring a load is to measure the strain on the load bearing components that is caused by the load. In particular, measured strain on the load bearing member varies depending on the load applied to the load bearing member. This measured strain can then be converted into a correlated load value to thereby provided a measured load that is supported by the load bearing member.

For example, U.S. Pat. No. 6,118,083 to Boyovich et al. discloses a weight measurement apparatus for determining the weight of a load supported by the axles of a tractor-trailer. A load bearing member, such as a trunnion member, is coupled between a portion of the suspension of the tractor-trailer. The weight measurement apparatus disclosed includes a plurality of strain gauges that are positioned in the trunnion member such that they straddle the principle stress axis of the trunnion member. The measured strain is then converted into a correlated load measurement that is supported by the trunnion member.

However, Boyovich et al. does not disclose a load measurement device which measures the load on an axle of a railcar, or a load measurement device that can be modified for such application. The suspension components of a railcar is significantly different than the suspension components of a tractor-trailer so that the device of Boyovich et al. cannot be readily implemented in a railcar. In particular, the invention disclosed in Boyovich et al. requires a specially designed trunnion member which is integral to the suspension of the tractor-trailer, but generally not utilized in railcars. In addition, provision and fitting of such a trunnion member is expensive and thus, cannot be easily and cost effectively implemented in tractor-trailers already in service, much less in railcars having a substantially different suspension.

Therefore, there exists an unfulfilled need for an improved load measurement device that is adapted to measure the vertical load on an axle of a railroad car. In particular, there still exists an unfulfilled need for such a load measurement device that is economical to implement.

SUMMARY OF THE INVENTION

The primary aspect of the present invention is in providing an improved load measurement device adapted to measure the vertical load on an axle of a railroad car.

One advantage of the present invention is in providing such a load measurement device that is economical to implement.

Another aspect of the present invention is in providing a method for measuring the vertical load on an axle of a railcar.

In accordance with one example embodiment, a vertical load measurement device is provided for measuring a load at least partially supported by an axle of a railcar, the measurement device including a bearing adapter sized to be mounted between a load bearing member of the railcar and an axle bearing housing of the railcar. The beam member has a first end and a second end, at least one end being secured to the bearing adapter, and a midsection extending between the ends which supports the load applied by the load bearing member of the railcar. The midsection of the beam member is vertically spaced from the bearing adapter to allow deflection of the beam member in response to the load applied by the load bearing member. The vertical load measurement device also includes a sensor secured to the beam member which measures the deflection of the beam member.

In accordance with one embodiment of the present invention, the bearing adapter includes an axle receiving portion which is substantially semicircular in shape. In accordance with another embodiment, the beam member is secured to the bearing adapter and oriented perpendicular to the load bearing member. In this regard, the beam member may be secured to the bearing adapter at both the first end and the second end to establish a fixed end condition at both ends. In one implementation, the load bearing member may be a side frame of a truck of the railcar.

In accordance with another embodiment of the present invention, the beam member includes a protrusion at an underside of the midsection, the protrusion extending toward the bearing adapter to limit deflection of the midsection of the beam member. In addition, the beam member may further include a load bearing section on a top surface of the midsection, the load bearing member contacting the load bearing section to exert the load thereon. The sensor may be implemented as at least one strain gauge which may be secured to the underside of the midsection. In this regard, the sensor is preferably implemented as a plurality of strain gauges.

In accordance with yet another embodiment of the present invention, the beam member is a plurality of beam members, each having a first end, a second end, and a midsection extending therebetween, the plurality of beam members being positioned parallel to each other and secured to the bearing adapter. In such an embodiment, the midsection of each beam member is vertically spaced from the bearing adapter, and each beam member includes a protrusion at an underside of the midsection that extends toward the bearing adapter to limit deflection. Preferably, the plurality of beam members are secured to the bearing adapter at both the first end and the second end to establish a fixed end condition for both ends.

In accordance with still another embodiment of the present invention, a vertical load measurement device is provided for measuring a load at least partially supported by an axle of a railcar including a bearing adapter sized to be mounted between a load bearing member of the railcar and an axle bearing housing of the railcar, the bearing adapter including a semicircular shaped axle receiving portion. The measurement device also includes a plurality of beam members, each beam member having a first end and a second end that are secured to the bearing adapter, and a midsection extending between the ends that supports the load applied by the load bearing member of the railcar. The midsection of each beam member is vertically spaced from the bearing adapter to allow the beam member to deflect in response to the load applied by the load bearing member. The measurement device further includes a plurality of sensors secured to an underside of each beam member that measures deflection of the plurality of beam members.

In one implementation, each of the plurality of beam members includes a protrusion at the underside of the midsection that extends toward the bearing adapter. In another embodiment, the sensor is implemented as a plurality of strain gauges.

In accordance with another aspect of the present invention, a method for measuring vertical load at least partially supported by an axle of a railcar is provided, the railcar having a load bearing member and an axle bearing housing. The method includes the steps of mounting a bearing adapter between the load bearing member and the axle bearing housing, providing at least one beam member having a first end, a second end, and a midsection extending therebetween, securing at least one of the ends of the beam member to the bearing adapter such that the midsection is vertically spaced from the bearing adapter, supporting the load applied by the load bearing member of the railcar with the midsection of the beam member so that the midsection is deflected, and measuring the deflection of the midsection of the beam member.

In accordance with one embodiment, the method further includes the step of converting the measured deflection into a load exerted by the load bearing member. In another embodiment, the step of measuring the deflection of the midsection may further include the step of measuring strain in the midsection of the beam member. The bearing adapter may include a substantially semicircular axle receiving portion, and the method may further include the step of mounting the bearing adapter so that the axle bearing housing is received in the axle receiving portion.

In yet another embodiment, the step of securing at least one of the first end and the second end of the beam member to the bearing adapter includes the step of securing both of the first end and the second end to establish a fixed end condition at each end. The method may further include the step of providing a protrusion at an underside of the midsection of the beam member which extends toward the bearing adapter to limit deflection of the midsection of the beam member. The step of measuring the deflection of the midsection of the beam member may be attained by at least one sensor secured to an underside of the midsection such as a plurality of strain gauges.

These and other advantages and features of the present invention will become more apparent from the following detailed description of the preferred embodiments of the present invention when viewed in conjunction with the accompanying drawings.

BRIEF DESCRIPTION OF THE DRAWINGS

FIG. 3 is a top view of the vertical load measurement device of FIG. 2.

FIG. 4 is a side view of the vertical load measurement device of FIG. 2.

FIG. 5 is a top view of a beam member in accordance with one embodiment of the present invention.

FIG. 6 is a side view of the beam member of FIG. 5.

DETAILED DESCRIPTION OF THE INVENTION

Figure 1:
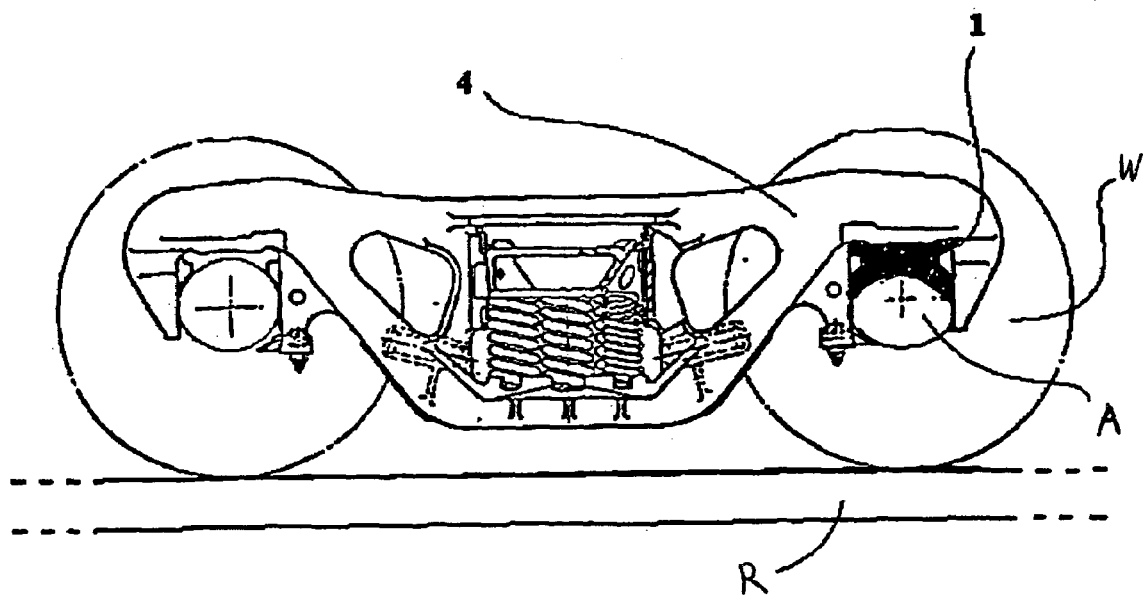
FIG. 1 is a profile view of a truck of a railroad car and the vertical load measurement device in accordance with one embodiment of the present invention which is installed thereon.
Figure 2:
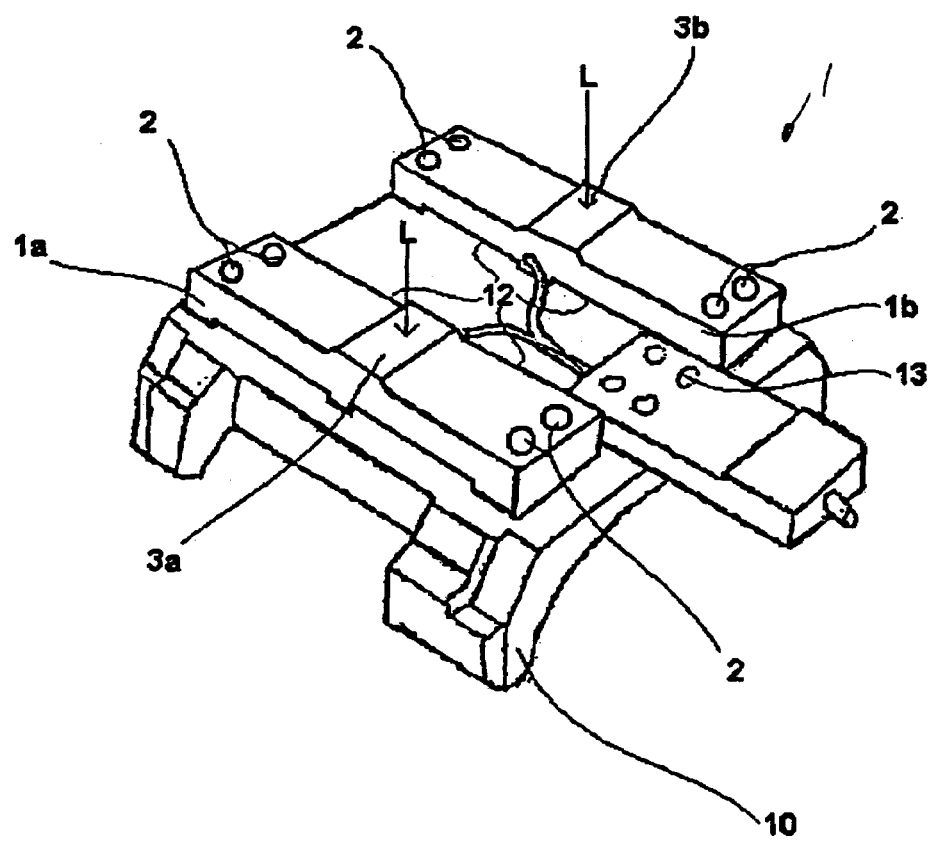
FIG. 2 is a perspective view of the vertical load measurement device in accordance with one embodiment of the present invention.

FIG. 1 is a profile view of a truck 4 of a railcar (not shown) having a vertical load measurement device 1 in accordance with one embodiment the present invention installed thereon. FIG. 2 is a perspective view of the vertical load measurement device 1 which is installed in the truck 4 of FIG. 1. As will be evident from the discussion below, the vertical load measurement device 1 allows accurate measurement of the vertical load that is at least partially supported by an axle of a railcar. In addition, it will also be evident that the vertical load measurement device 1 is economical to implement, even in railcars that are already in service.

As shown in FIG. 1, the vertical load measurement device 1 of the present invention is adapted to be installed on an axle A of the railcar, a wheel W being rotatably mounted to the axle A. In illustrated implementation, one end of the truck 4 lies across the vertical load measurement device 1, the truck 4 being oriented parallel to the railcar's orientation along a railroad track R and perpendicular to the axle A. Thus, a portion of the total load that is supported by the truck 4 which is a load bearing member, is applied to the vertical load measurement device 1.

It should be noted that whereas in the illustration of FIG. 1, only one vertical load measurement device 1 is shown, another vertical load measurement device is preferably positioned on the opposite end of the axle A to thereby allow measurement of the load that is supported by axle A of the truck 4. Moreover, it should also be appreciated that the other axles of the railcar may be provided with two or more vertical load measurement devices that are similarly implemented to allow measurement of the load supported by each of the axles. Thus, because a conventional railcars include two trucks, each truck typically having two axles, a conventional railcar may be provided with eight vertical load measurement devices of the present invention to allow determination of the load supported by each of the axles, and to allow determination of the weight of the railcar.

FIG. 2 illustrates a perspective view of the vertical load measurement device 1 in accordance with one embodiment of the present invention. The vertical load measurement device 1 includes a bearing adapter 10 that allows the vertical load measurement device 1 to be mounted to the truck 4 of the railcar as described relative to FIG. 1 discussed above. In addition, the vertical load measurement device 1 further includes beam members 1a and 1b which are mounted onto the bearing adapter 10, for example, via through holes 2 using any appropriate fasteners such as those known in the art.

The beam members 1a and 1b include load bearing sections 3a and 3b, respectively, which are slightly raised sections positioned at the center of beam members 1a and 1b. The load bearing sections 3a and 3b serve as the contact point for a load bearing member such as the truck 4 when the vertical load measurement device 1 is mounted thereto in the manner shown in FIG. 1. Load L is applied to load bearing sections 3a and 3b, the load L relating to the portion of weight of the rail car and its contents that is supported by the axle A.

The load L causes the midsection of the beam members 1a and 1b to deflect downwardly toward bearing adapter 10. Strain gauges 12 are mounted to the underside of beam members 1a and 1b in a manner shown in FIG. 2 and as best shown in FIG. 6. The strain gauges 12 are mounted on the beam members substantially centrally in the midsection of the beam members which are subject to maximum deflection so that deflection may be measured with increased accuracy and resolution. In addition, in the illustrated embodiment, mounting the strain gauges 12 on the underside of the beam members 1a and 1b, as shown, reduces the need for complex wiring and waterproofing.

Thus, when beam members 1a and 1b deflect in response to the load L, strain gauges 12 measure the magnitude of the deflection of beam members 1a and 1b, respectively, thereby allowing for a measurement of vertical load L. The signal provided by strain gauges 12 can be transmitted and processed by any appropriate means known in the art to quantify the measured strain into a vertical load L. For example, a processor may be provided with a conversion table in memory for converting the signal provided by the strain gauges 12 to a vertical load value. In addition, the strain gauges 12 may be implemented as a plurality of strain gauges that are arranged as a rosette to provide a more accurate measurement of the deflection of the beam members 1a and 1b.

FIGS. 3 and 4 show top and side views, respectively, of the vertical load measurement device 1 of FIG. 2. As shown, beam members 1a and 1b are mounted on bearing adapter 10 such that beam members 1a and 1b are arranged substantially parallel to one another and extend substantially perpendicular to the length of the railroad car. This orientation allows load bearing side frame T of the truck 4 of the railroad car to extend across the beam members 1a and 1b, thereby distributing load L across beam members 1a and 1b at the load bearing sections 3a and 3b, respectively.

FIGS. 5 and 6 show various views of beam member 1a of the vertical load measurement device 1 in accordance with one embodiment of the present invention. It should be noted that whereas the features of beam member 1a is described in detail herein, beam member 1b may be implemented in substantially the same manner. As shown in FIG. 5, beam member 1a is generally rectangular in shape, with a plurality of mounting holes 2a and 2b near each end thereof, for example, two holes in each end. Fasteners are inserted through mounting holes 2a and 2b to mount beam member 1a to the bearing adapter 10, as shown in FIGS. 2 to 4.

The section of beam member 1a having mounting holes 2a and 2b by which the beam member 1a is mounted on the bearing adapter 10, is implemented as a boss so that it is slightly raised in the direction of the bearing adapter 10. Thus, when the beam member 1a is mounted to the bearing adapter as shown in FIGS. 2 to 4, a fixed-end condition is created in which both ends of the beam member 1a are secured, and beam member 1a is provided with a gap between the bearing adapter 10 and the beam member 1a. This gap, as most clearly shown in FIG. 6, allows the midsection of the beam member 1a to be deflected toward the bearing adapter 10 when load L is applied to the load bearing section 3a.

As clearly shown in FIG. 6, the beam member 1a also includes protrusion 5 on the underside of beam member 1a, preferably in the center of the underside of beam member 1a. The protrusion 5 extends downwardly toward the bearing adapter 10 when the beam member 1a is secured thereto, but does not contact the bearing adapter 10. In other words, the protrusion 5 does not extend as far down as the bosses with the mounting holes 2a and 2b. However, as load L is applied to load bearing section 3a of beam member 1a by the side frame T of the truck 4, the center of the beam member 1a is deflected downward toward the bearing adapter 10, the amount of deflection corresponding to the magnitude of the applied load L. As previously described, the strain gauges 12 mounted to the underside of the beam member 1a thereby detect and measure any deflection of beam member 1a caused by the applied load L so that the measured strain can be converted to an actual vertical load.

When load L exceeds a predetermined load, the center of the beam member 1a is deflected downward toward the bearing adapter 10 sufficiently so that protrusion 5 of the beam member 1a abuts against the bearing adapter 10. This contact of the protrusion 5 on the bearing adapter 10 effectively prevents damage to the strain gauges 12 mounted to the underside of the beam member 1a by preventing over deflection of the beam member 1a. Thus, the protrusion effectively acts as a stop to limit the amount of deflection of the beam member 1a.

As noted above, the beam member 1b is designed and functions in substantially the same manner as beam member 1a described. Thus, the beam member 1b is secured to the bearing adapter 10 to thereby form a gap to allow defection of the beam member 1b, the deflection being measured by strain gauges (not shown). Moreover, the beam member 1b is preferably provided with a protrusion that limits the amount of deflection of the beam member 1b in the manner previously described relative to beam member 1a.

Thus, in view of the above, it should be evident how the vertical load measurement device 1 in accordance with the present invention may be used to determine the load supported by an axle or other component of a railroad car, or other vehicle. The present invention can also be utilized in experimental applications, for example, to determine vertical loads prior to the derailment of railroad cars, which can aid in preventing future derailments.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A vertical load measurement device for measuring a load at least partially supported by an axle of a railcar comprising:

a bearing adapter sized to be mounted between a load bearing member of the railcar and an axle bearing housing of the railcar;

at least one elongate beam member having a first end and a second end, at least one of said first end and said second end being secured to said bearing adapter, and a midsection extending between said first end and said second end which supports the load applied by the load bearing member of the railcar, said midsection being vertically spaced from said bearing adapter to allow deflection of said at least one elongate beam member in response to the load applied by the load bearing member; and a sensor secured to said elongate beam member which measures said deflection of said elongate beam member.

2. The measurement device of claim 1, wherein said bearing adapter includes an axle receiving portion.

3. The measurement device of claim 2, wherein said axle receiving portion is substantially semicircular in shape.

4. The measurement device of claim 1, wherein said at least one elongate beam member is secured to said bearing adapter and oriented perpendicular to said load bearing member.

5. The measurement device of claim 4, wherein said load bearing member is a side frame of a truck of the railcar.

6. The measurement device of claim 4, wherein said at least one elongate beam member is secured to said bearing adapter at both said first end and said second end to establish a fixed end condition at both ends.

7. The measurement device of claim 1, wherein said at least one elongate beam member includes a protrusion at an underside of said midsection, said protrusion extending toward said bearing adapter to limit deflection of said midsection of said elongate beam member upon contact with said bearing adapter.

8. The measurement device of claim 1, wherein said at least one elongate beam member further includes a load bearing section on a top surface of said midsection, the load bearing member contacting said load bearing section to exert the load thereon.

9. The measurement device of claim 1, wherein said sensor is at least one strain gauge.

10. The measurement device of claim 9, wherein said at least one strain gauge is secured to said underside of said midsection.

11. The measurement device of claim 9, wherein said at least one strain gauge is a plurality of strain gauges.

12. A vertical load measurement device for measuring a load at least partially supported by an axle of a railcar comprising:

a bearing adapter sized to be mounted between a load bearing member of the railcar and an axle bearing housing of the railcar;

at least one beam member having a first end and a second end, at least one of said first end and said second end being secured to said bearing adapter, and a midsection extending between said first end and said second end which supports the load applied by the load bearing member of the railcar, said midsection being vertically spaced from said bearing adapter to allow deflection of said at least one beam member in response to the load applied by the load bearing member; and a sensor secured to said beam member which measures said deflection of said beam member, wherein said at least one beam member is a plurality of beam members, each having a first end, a second end, and a midsection extending therebetween, said plurality of beam members being positioned parallel to each other and secured to said bearing adapter.

13. The measurement device of claim 12, wherein said midsection of each of said plurality of beam members is vertically spaced from said bearing adapter to allow deflection of said plurality of beam members in response to the load applied by the load bearing member.

14. The measurement device of claim 13, wherein each of said plurality of beam members includes a protrusion at an underside of said midsection that extends toward said bearing adapter to limit deflection.

15. The measurement device of claim 12, wherein each of said plurality of beam members are secured to said bearing adapter at both said first end and said second end to establish a fixed end condition at both ends.

16. A vertical load measurement device for measuring a load at least partially supported by an axle of a railcar comprising:

a bearing adapter sized to be mounted between a load bearing member of the railcar and an axle bearing housing of the railcar, said bearing adapter including a semicircular shaped axle receiving portion;

a plurality of beam members, each beam member having a first end and a second end that are secured to said bearing adapter, and a midsection extending between said first end and said second end which supports the load applied by the load bearing member of the railcar, said midsection being vertically spaced from said bearing adapter to allow said beam member to deflect in response to the load applied by the load bearing member; and a plurality of sensors secured to an underside of each beam member that measures deflection thereof.

17. The measurement device of claim 16, wherein each of said plurality of beam members includes a protrusion at said underside of said midsection that extends toward said bearing adapter.

18. The measurement device of claim 16, wherein said sensor is a plurality of strain gauges.

19. A method for measuring vertical load at least partially supported by an axle of a railcar having a load bearing member and an axle bearing housing, said method comprising the steps of:

mounting a bearing adapter between the load bearing member of the railcar and the axle bearing housing of the railcar;

providing at least one elongate beam member having a first end, a second end, and a midsection extending between said first end and said second end;

securing at least one of said first end and said second end of said at least one elongate beam member to said bearing adapter in a manner that said midsection is vertically spaced from said bearing adapter;

supporting the load applied by the load bearing member of the railcar with said midsection of said at least one elongate beam member, said midsection of said at least one elongate beam member being deflected in response to the supported load; and measuring the deflection of said midsection of said at least one elongate beam member.

20. The method of claim 19, further including the step of converting said measured deflection into a load exerted by the load bearing member.

21. The method of claim 19, wherein said step of measuring the deflection of said midsection includes the step of measuring strain in said midsection of said at least one elongate beam member.

22. The method of claim 19, wherein said bearing adapter includes a substantially semicircular axle receiving portion, said method further including the step of mounting said bearing adapter so that said axle bearing housing is received in said axle receiving portion.

23. The method of claim 19, wherein said step of securing at least one of said first end and said second end of said at least one elongate beam member to said bearing adapter includes the step of securing both of said first end and said second end to establish a fixed end condition at each end.

24. The method of claim 19, further including the step of providing a protrusion at an underside of said midsection of said at least one elongate beam member which extends toward said bearing adapter to limit deflection of said midsection of said elongate beam member upon contact with said bearing adapter.

25. The method of claim 19, wherein said step of measuring the deflection of said midsection of said at least one elongate beam member is attained by at least one sensor secured to an underside of said midsection.

26. The method of claim 25, wherein said at least one sensor is a plurality of strain gauges.

27. A vertical load measurement device for measuring a load at least partially supported by an axle of a railcar comprising:

a bearing adapter sized to be mounted between a truck of the railcar and an axle bearing housing of the railcar;

at least one beam member having a first end and a second end, at least one of said first end and said second end being secured to said bearing adapter, and a midsection extending between said first end and said second end which supports the load applied by the truck of the railcar, said midsection being vertically spaced from said bearing adapter to allow deflection of said at least one beam member in response to the load applied by the truck; and a sensor secured to said beam member which measures said deflection of said beam member.

* * * * *